United States Patent [19]

Stofko et al.

[11] 4,007,312

[45] Feb. 8, 1977

[54] METHOD OF BONDING SOLID LIGNOCELLULOSIC MATERIAL, AND RESULTING PRODUCT

[75] Inventors: Jan Stofko, Albany; Eugene Zavarin, San Francisco, both of Calif.

[73] Assignee: The Regents of the University of California, Berkeley, Calif.

[22] Filed: Sept. 27, 1973

[21] Appl. No.: 401,370

[52] U.S. Cl. .......................... 428/420; 144/309 Q; 144/327; 156/307; 156/62.2; 428/535; 428/537

[51] Int. Cl.² ........................ C09J 1/00; C09J 5/00

[58] Field of Search ....................... 106/163 R, 203; 117/143 B, 147, 137; 144/309 D, 309 P, 309 Q, 309 Y, 327; 156/62.2, 307, 310, 314, 319, 305; 161/188, 268, 270, 403; 264/113, 123, 124; 428/420, 535, 537, 921, 541, 543

[56] References Cited

UNITED STATES PATENTS

| | | | |
|---|---|---|---|
| 2,177,160 | 10/1939 | Tischer | 144/309 D |
| 2,298,017 | 10/1942 | Loughborough | 144/309 D |
| 3,033,695 | 5/1962 | Glab | 106/163 R |
| 3,137,607 | 6/1964 | Goldstein et al. | 156/281 |
| 3,556,897 | 1/1971 | Christoffersen et al. | 156/310 |

*Primary Examiner*—Charles E. Van Horn
*Assistant Examiner*—John E. Kittle
*Attorney, Agent, or Firm*—Edward B. Gregg

[57] ABSTRACT

Solid lignocellulosic material is bonded into a strong solid mass by treating with a liquid carrier containing an oxidant, and pressing under heat and pressure in a conventional unsealed press for a period of time sufficient to effect bonding by oxidation. Plywood formed of wood veneers is advantageously formed. Catalysts or other modifying agents may be employed with the oxidant.

16 Claims, No Drawings

METHOD OF BONDING SOLID LIGNOCELLULOSIC MATERIAL, AND RESULTING PRODUCT

BACKGROUND OF THE INVENTION

Bonding of lignocellulosic material, such as wood, is widely used commercially, such as in the manufacture of particle board, laminated wood products, and plywood. In present commercial bonding procedures, an adhesive is employed, which is spread or otherwise applied to the surface of the material, and penetrates the wood structure whereby bonding is effected primarily by the adhesive. Procedures have been proposed to effect such bonding by chemical reaction between reagents and the wood through formation of wood-to-wood chemical bonds, but have not met commercial acceptance.

For example, the patent to Wilson, U.S. Pat. No. 2,639,994, dated May 26, 1953, discloses a method of bonding lignocellulosic material wherein relatively small wood particles, such as wood shavings, are bonded by adding water to increase the normal moisture content, spraying with a dilute solution of an acid, placing the material in a conventional board mold and pressing in a press at an elevated temperature. No teaching is made in this patent that relatively large plywood veneers can be so treated to form plywood nor is the reaction with acid an oxidizing reaction. Glab, U.S. Pat. No. 3,033,695, dated May 3, 1962, discloses a process wherein wood particles may be first digested in an autoclave with acid, such as nitric acid, and then subsequently molded in a press.

SUMMARY AND OBJECTS OF THE INVENTION

In the invention hereof, lignocellulosic material, especially wood veneer generally employed in the manufacture of plywood, is wetted on its surface with a liquid carrier containing an oxidizing agent and the surface is engaged or brought into contact with a surface of an adjacent veneer. They are then pressed in a conventional press under pressure and advantageously under elevated temperature to effect a strong bond between the surfaces of such veneers by the oxidative effect of the oxidant reacting with the wood in the press.

Two adjacent surfaces may be so wetted; and a catalyst or a modifying agent may be employed in the carrier and applied to one surface with the oxidizing agent, or the catalyst may be applied in a liquid carrier to one surface and the oxidizing agent to another surface. Thus, a procedure is provided which is essentially a two-step process, namely treatment of the lignocellulosic material outside the press, and bringing surfaces together and then effecting the oxidative coupling reaction to cause the bonding in the press. After such reaction, the resultant product is removed from the press and allowed to cool to room temperature. The pressing can be effected promptly after reagent application to the lignocellulosic material.

From the preceeding, it is seen that the invention has as its objects, among others, a simple and economical procedure for the bonding of lignocellulosic material, which is particularly adapted for the manufacture of laminates or plywood panels without the use of adhesives. Other objects will become apparent from the following more detailed description.

DETAILED DESCRIPTION

It is well known that wood is a high polymeric substance of a complicated structure composed of three classes of compounds; namely carbohydrates (cellulose), lignin and extractives. While cellulose is a polysaccharide build-up of glucose units, lignin appears to be a very complicated phenolic compound the structure of which has not been entirely satisfactorily determined. Not much is known about the character of the bond between the carbohydrates and lignin, although, generally speaking, lignin seems to function as a binder of cellulose microfibrils. The function of extractives appears to be manifold; their disease protective function probably is the most important.

The chemical reactions involved in the bonding systems hereof are not fully understood. Theoretically, several reaction systems may be involved at the same time. The most important, however, appear to be oxidative coupling reactions.

It is believed that in the instant process, oxidative coupling of phenolic units contained in wood is either the main or at least one of the main reactions leading to self bonding of lignocellulosic materials. It cannot be excluded that some polysaccharide-to-polysaccharide, or lignin-to-polysaccharide bonding also takes place during the oxidation. With the procedure hereof, it is possible that conditions could be created for the free radical formation and their subsequent coupling precisely at the time when surfaces to be bonded are in a close contact.

Catalysts may be employed to modify the oxidative coupling reaction in the press. As catalysts any material can be used with the oxidants, which are able to speed-up, modify or improve the action of oxidizing agents per se. They include transition metal salts or oxides, which are known as promoters of many oxidation reactions. They can also include various reducing agents, organic and inorganic, which used in small amounts, can in some cases effectively initiate the oxidation reaction, particularly if the latter takes place by a chain mechanism. In come cases catalysts can be achieved by using two oxidation agents, with one acting as a catalyst for the other.

The procedure hereof of reacting oxidants with solid lignocellulosic material possesses exceptional versatility and leads to products with remarkable properties. The oxidative bonding in the press can be carried out at low temperatures for a longer time or at elevated temperature in a shorter time depending on the amount and chemical nature of reagents and catalysts. The strength of bonds formed between pieces of wood is comparable to the strength of bonds achieved by conventional adhesives.

In the manufacture of plywood it is only necessary to cover at least one surface of a wood veneer with a liquid carrier containing the oxidant, bringing such surface in contact with the surface of another veneer, and pressing as mentioned before, which can be done immediately after application of the oxidant. The amount of oxidizing agent will vary widely depending upon the character of the wood, the power of the oxidizing agent and the pressing conditions desired. Only a thinly spread coating or film of the carrier need by applied which can be conveniently done by brushing, roller spreading or spraying onto the surface; and this coating need not be continuous. In general, an amount of carrier is employed which will provide from 0.5 to 5.0 grams of oxidant per square foot of area depending on the oxidant but this may vary widely. The oxidant may be in solution or dispersion in the carrier, but in any event it is uniformly distributed therein. Any liquid carrier may be employed which is non-reactant with the wood, such as water, alcohol and other solvents.

A catalyst for promoting (or otherwise modifying oxidation) also may be employed as well as any other chemical reagent which will either accelerate or reduce extent of oxidation depending upon conditions which may vary widely. The catalyst may be incorporated in a desired amount in the same carrier liquid as the oxidant or it may be applied in a separate carrier liquid. As previously related, the catalyst or other modifying agent may be applied to one surface to be bonded and the oxidant to the other surface. The catalyst and oxidant may be incorporated in the same carrier. Mixtures of oxidants in a carrier may be employed and so may mixtures of catalysts or other modifying agents, but it is not necessary to the principle of this invention to use catalysts. Excess amounts of oxidants and catalysts wetted on the surface of the veneer are immaterial, but uneconomical. It is merely necessary to have sufficient oxidant to effect the bonding reaction in the press under heat and pressure.

The amount of oxidant will vary, as previously pointed out, depending upon its character, the character of the wood, and the pressing conditions. Thus, with Douglas fir veneer and hydrogen peroxide as an oxidant in water as the carrier and pressing conditions of 150 p.s.i., and temperatures of 130° C for about 2 minutes, an amount of oxidant of about 1 gram per square foot will suffice. The minimum amount of oxidant under these conditions may be 0.5 grams per square foot, in other words, an amount sufficient to be effective. With ferric chloride as an oxidant, an amount of 2.5 grams per square foot will suffice.

In a system wherein potassium persulfate is employed as an oxidant and ferrous sulfate as a catalyst to promote the oxidation, an amount of oxidant effective to produce the bonding is about 1.5 grams per square foot; and the amount of a catalyst in a very minor amount of about 5.0% of the amount of oxidant.

From the preceeding, it is seen that a wide variety of oxidizing agents may be employed, among which are: Chromates such as calcium chromate, ammonium bichromate, potassium bichromate, and sodium bichromate; Chromic acid; Nitrates such as ammonium nitrate, magnesium nitrate, potassium nitrate, and sodium nitrate; Nitrites such as sodium nitrite; Peroxides such as barium peroxide, hydrogen peroxide, sodium peroxide and organic peroxides such as dibenzoyl peroxide; Hypochlorites such as calcium hypochlorite; Chlorites such as sodium chlorite; Chlorates such as sodium chlorate, and potassium chlorate; Perchlorates such as potassium perchlorate; Halogens such as chlorine and bromine; Permanganates such as potassium permanganate; Ozone; Manganese dioxide; Lead dioxide; Ferric compounds such as ferric sulfate and ferric chloride; and Persulfates (and other organic and inorganic "per" compounds) such as ammonium persulfate, potassium persulfate, potassium perborate, peracetic acid, and ozonides.

Typical catalysts are: Metallic salts such as ferric, ferrous, manganese, chromium, lead, copper, cobalt, and other salts of transition metals; Reducing agents, organic and inorganic, such as hydroquinone, pyrogallol, tannins, hydrazine, and bisulfites; and Oxidation agents.

Pressing conditions in the press will vary widely depending upon variables, such as character of oxidant, and character of the cellulosic material. As usual for any given system, the lower the temperature, the longer the pressing time and vice versa. The pressing temperature should not exceed the temperature at which charring of the lignocellulosic material will occur not should the pressure exceed that at which the lignocellulosic material in the manufacture of plywood panels is crushed. At higher amounts of some very active oxidants, such as hydrogen peroxide, the temperature may even be ambient temperature because sufficient heat can be created by the oxidative reaction itself, but desirably the press is heated to shorten pressing time. Thus the temperature range may vary from 20° to 200° C for speed of reaction, the practical range is 80° to 200° C. A suitable pressure range is 60 to 300 p.s.i. and a pressing time of about 4 to 50 minutes per 1 inch thickness of board depending on the character of reactants and pressing temperature.

Although not critical to the bonding effect, it has been found that if the bonding conditions are too alkaline, the resultant product may not withstand the hot water boiling test for plywood. To obtain good weathering resistance, the bonding conditions should preferably be on the high acid side at the pH 0.5–1.5. For interior plywood, it may be only slightly acid to neutral (pH 3.5–7.5). An important factor which affects acidity is the type of oxidant, as well as character of the wood, as different woods, such as Douglas fir, Incense cedar, and White fir, commonly employed, have varying pH. Therefore, depending upon end product properties desired, one may either add acid or alkali to the carrier for the oxidant or the catalyst to obtain the desired pH range for any particular conditions. This can be readily determined by normal test procedures to determine optimum conditions desired. Also, such test procedure may be employed for determining optimum conditions for any given oxidant or oxidant catalyst system employed.

If only one surface of a veneer is wetted with oxidant and carrier, and the other surface to be brought into engagement therewith unwetted, it is advantageous to engage the surfaces while the wetted surface is still wet to cause good transfer of the oxidant in the press to the unwetted surface. However, if both surfaces to be brought into engagement are wetted with oxidant then it is not important whether they are brought into engagement dry or wet because the oxidant on both surfaces will react with the wood to effect the oxidative bonding reaction.

Although the invention is particularly advantageous for the manufacture of plywood panels, it can be used for making so-called particle board from divided particles of lignocellulosic material, such as wood shavings and sawdust, or the like. In the manufacture of such products, the same procedure is followed except that the particles are thoroughly mixed with the carrier for the oxidant, and catalyst if used, formed into a mat by shaping in a form, and then pressing in the conventional unsealed press in the manner described, to effect the oxidative reaction essentially in the press. The following are examples typifying the invention hereof.

EXAMPLE I

A two ply plywood laminate was formed of two Incense Cedar veneers each of the size 7¼× 2¾ × 3/16 inches of a natural moisture content of about 9%. Only one surface of one of the veneer panels was sprayed with a 40% solution of ferric chloride as an oxidizing agent in ethyl alcohol. The amount of solution sprayed on such surface was equivalent to about 0.5 grams per square foot. The surface of the veneer while still wet with the oxidant was brought into engagement (in about one minute) with a surface of the untreated veneer, and promptly deposited in a conventional open plywood press with press platens at a temperature of about 145° C and pressure of 85 p.s.i. After 5 minutes pressing time, the laminate was removed from the press, and cooled to room temperature. The same procedure was followed differing only in the amount of solution sprayed on the surface of one veneer which was in increments up to 3 grams per square foot. Shear strength tests on 22 samples averaged 385 p.s.i. The bond was resistant to 4 hours in boiling water.

EXAMPLE II

Three Douglas fir veneers were used to form a three ply plywood, each veneer being 1 foot square and ⅛ inch thick with a natural moisture content of about 4.0%. The outer surfaces of the veneers for forming the outer plys were untreated. Two of the remaining surfaces were each treated with an aqueous hydrogen peroxide solution and each of the other two surfaces with an aqueous solution of ferric chloride as a catalyst. The three plys were brought together with a hydrogen peroxide treated surface in engagement with a catalyst treated surface.

The hydrogen peroxide concentration was 50% and the amount applied was about 0.5 grams of solution per square foot. The ferric chloride concentration was about 1% applied in the same amount per square foot.

After application of the reactants, the surfaces of the plys were brought together in about 2 minutes and promptly placed in the conventional unsealed plywood press, and pressed at a pressure of 180 p.s.i. and temperature of 130° C for 2 minutes. The same procedure was followed differing only in the amount of reagents applied, which was in increments up to 3 grams per square foot. Shear strength tests on 20 samples was found to be about 235 p.s.i. which is comparable to standard shear strength of Douglas fir plywood. The bond was resistant to boiling water for 4 hours.

EXAMPLE III

A three ply plywood panel was made of Douglas fir veneers 6 × 6 inches and ⅛ inch thickness with a moisture content of about 4%. They were sprayed with a water solution containing 15% of hydrogen peroxide, 0.75% of zirconium tetrachloride and 1% of sulfuric acid (the latter two as catalysts) in an amount of 2.5 grams of solution per square foot. Core veneer (center veneer) was sprayed on both sides, surface veneers only on sides coming into contact with the core veneer. After application of the solution, the veneers were brought together in about 1 minute, promptly placed in the press, and a three ply plywood panel was made by pressing in the press at a pressure of 180 p.s.i. and temperature of 150° C for 3 minutes. Shear strength tests in dry conditions on 10 specimens showed a dry shear value of about 210 p.s.i.

EXAMPLE IV

As in Example III, a three ply plywood panel was made of Douglas fir veneers each of the same size and thickness but having a moisture content of about 5%. They were sprayed with a water solution containing 4% of sodium chlorate (oxidant) and 4% hydrochloric acid (catalyst) in an amount of 8 grams of solution per square foot. The core veneer was sprayed on both sides and the surface veneers only on the sides coming into contact with the core veneer. In about 1 minute after solution application, the veneers were brought into engagement, promptly placed in the press, and pressed at a pressure of 180 p.s.i. and temperature of 150° C for 7 minutes. Shear strength after 4 hours in boiling water followed by 20 hours drying at 53° C, and again 4 hours in boiling water, was found to be about 75 p.s.i. in wet condition.

EXAMPLE V

One part of White fir wood shavings with a moisture content of about 12% were sprayed with a solution containing 50% of hydrogen peroxide in the amount of 10% to wood weight. Another equal part of such shavings were sprayed with a catalyst solution containing 1% of ferrous sulfate and 2.5% of hydrochloric acid in the amount of 10% to wood weight. Following this, equal amounts of the respective shavings sprayed with hydrogen peroxide and with ferrous sulfate were mixed together and a conventional particle mat was formed. After cold pressing to compact the particle mat, it was promptly pressed at the temperature of 130° C for 2 minutes at a pressure sufficient to produce a board ⅝ of inch thick with a specific gravity of 0.70. After cooling to room temperature internal bond tests performed showed internal bond value of about 65 p.s.i. at the specific gravity of 0.70.

From review of these examples, it is apparent that the addition of even a small amount of oxidant to surfaces of lignocellulosic material results in the creation of a chemical bond between two surfaces under pressing conditions. The strength of the bond is comparable to strength achieved by traditional adhesives and the bonds are resistant to water. The economic advantage of such system is great because the amount of oxidizing agent which is used represents about 1/10 to 1/15 of the amount of adhesive which might be used at the same condition. At current price of most oxidizing agents applicable in this bonding system, the cost of reagents per unit bonded area represents only about 1/10 to 1/5 of the cost of the most extensively used adhesives, such as urea-formaldehyde or phenol-formaldehyde.

We claim:

1. The method of bonding together into a solid product discrete solid lignocellulosic material by surface wetting such material with a liquid carrier containing an oxidizing agent, and pressing such surfaces together in an unsealed press under heat and pressure and for a time sufficient to effect said bonding by oxidation bonding reaction.

2. The method of claim 1 wherein such lignocellulosic material is also wetted with a liquid carrier containing a catalyst which promotes said oxidation bonding reaction.

3. The method of claim 1 wherein the lignocellulosic material is natural wood.

4. The method of claim 3 wherein the wood comprises particles which are bonded in the press to form particle board.

5. The method of claim 3 wherein the wood comprises veneer panels which are bonded in the press to form plywood.

6. The method of making plywood laminate from wood veneer panels which comprises wetting at least one surface of a panel with a liquid carrier containing an oxidizing agent, contacting said wetted surface against the surface of another panel, and pressing said surfaces together in an unsealed press under heat and pressure and for a time sufficient to effect oxidative bonding of panels together.

7. The method of claim 6 wherein the carrier liquid also contains a catalyst which promotes said oxidative bonding.

8. The method of claim 6 wherein the surface of said another panel is wetted with a liquid carrier containing a catalyst which promotes said oxidative bonding.

9. The method of claim 6 wherein said oxidative bonding in said press is effected at an elevated temperature not exceeding the temperature at which charring of the wood occurs.

10. The method of claim 9 wherein the temperature in said press is between about 20° and 200° C, the pressure about 60 to 300 p.s.i., and the time about 4 to 50 minutes per one inch of thickness.

11. The method of claim 6 wherein the liquid carrier is roller spread, sprayed or brushed onto such surface.

12. The method of claim 6 wherein the liquid carrier is water in which the oxidant is dissolved.

13. The method of bonding together discrete pieces of solid wood into a solid product which comprises surface wetting such wood with a liquid carrier containing an oxidizing agent, placing the thus wetted wood in an unsealed press, and effecting an oxidative reaction in the press between such treated surfaces by pressing them together under heat and pressure and for a time sufficient to effect the bonding by said oxidative reaction.

14. The method of bonding together discrete pieces of solid wood into a solid product without the use of adhesives conventionally employed in the bonding of wood which comprises surface wetting the wood with a liquid carrier non-reactive with the wood and containing an oxidant as the agent for effecting said bonding under heat and pressure and a catalyst which promotes oxidation of the oxidant, placing the thus wetted wood in an unsealed press, and effecting an oxidative reaction in the press between surfaces of said wood pieces by pressing them together under heat and pressure and for a time sufficient to effect the bonding solely by said oxidative reaction.

15. Particle board obtained by the method of claim 4.

16. Plywood laminate obtained by the method of claim 6.

* * * * *